United States Patent [19]

Schiffer

[11] Patent Number: 4,530,142

[45] Date of Patent: Jul. 23, 1985

[54] TUBING DISCONNECT TOOL

[76] Inventor: John H. Schiffer, 25541 King Rd., Romulus, Mich. 48174

[21] Appl. No.: 543,410

[22] Filed: Oct. 19, 1983

[51] Int. Cl.[3] .............................................. B23P 19/04

[52] U.S. Cl. ........................................ 29/237; 29/268

[58] Field of Search .................. 29/237, 239, 268, 764

[56] References Cited

U.S. PATENT DOCUMENTS

| | | | |
|---|---|---|---|
| 2,722,857 | 11/1955 | Lacey | 29/268 |
| 3,757,406 | 9/1973 | Bezar | 29/764 |
| 3,964,148 | 6/1976 | Sturtevant | 29/764 |
| 4,050,464 | 9/1977 | Hall | 29/268 |

*Primary Examiner*—James L. Jones, Jr.
*Attorney, Agent, or Firm*—Barnes Kisselle Raisch Choate Whittemore & Hulbert

[57] ABSTRACT

A hand tool for disconnecting a tubular member from an associated connector fitting by imparting relative separation forces thereon in a direction generally axially of the tubing. The tool includes a frame adapted to engage the fitting to exert a separating force thereon, a bell crank pivotally connected to the frame and having a plunger movably mounted thereon and operable for engaging and releasing the tubing in the vicinity of said fitting. The tool also has a lever pivotally connected to the frame and movable relative to the bell crank for sequentially imparting tube gripping engagement of the tubing by the plunger and bell crank and then pivoting motion to the bell crank to thereby draw the tubing away from the fitting and thus disconnect the same. The plunger has a squeeze block mounted on one end thereof and movable relative to a juxtaposed tube-engaging portion of said bell crank. The plunger also has a follower mounted thereon remote from said squeeze block and operably engageable with the lever such that movement of said lever relative to said bell crank through a first stage of motion advances said squeeze block into engagement with the tubing and squeezes the tubing between the squeeze block and bell crank and imparts in a sequential second stage of motion the pivotal tube stripping motion to said bell crank. A coil compression spring encircles the plunger rod and is disposed between the bell crank and follower. A second coil compression spring is disposed between the bell crank and yieldably biases the bell crank towards an initial position abutting the frame.

9 Claims, 7 Drawing Figures

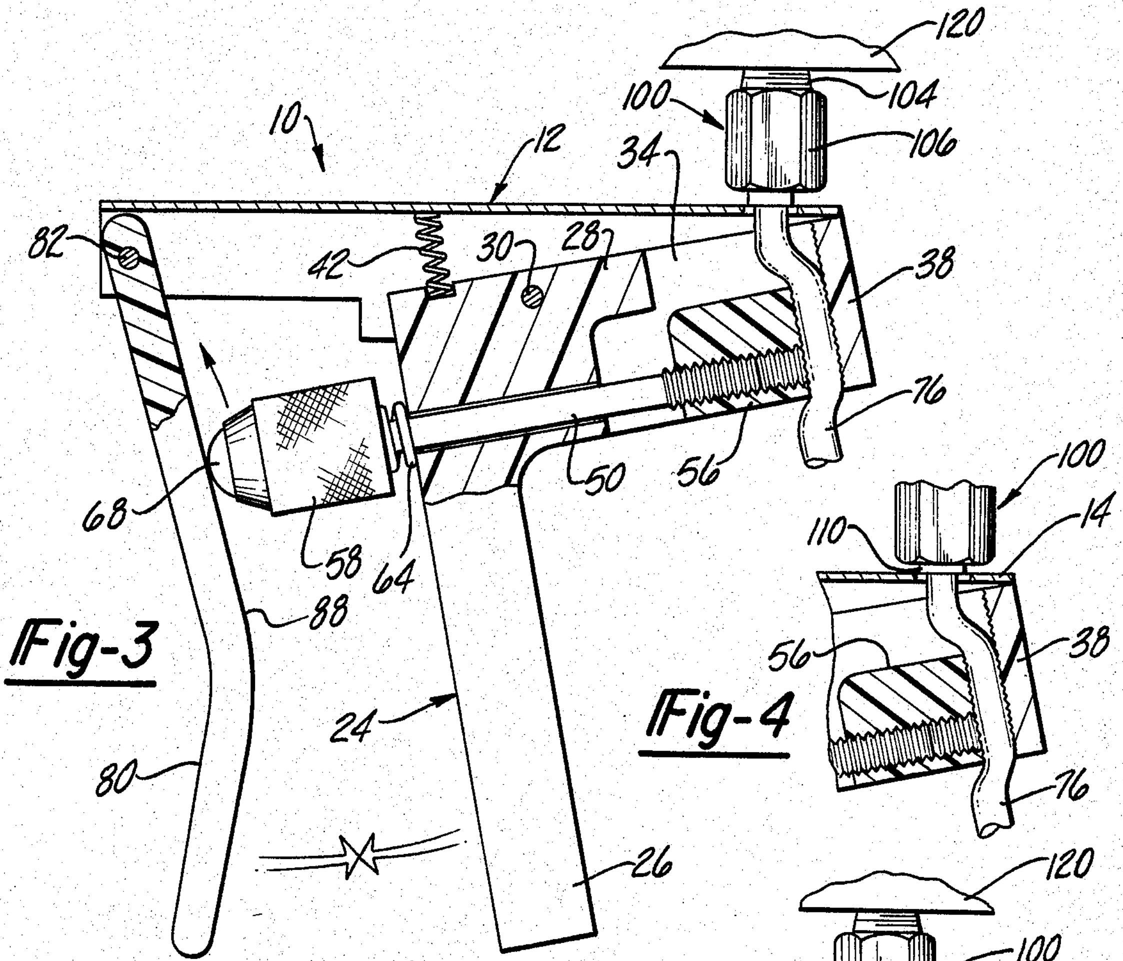
Fig-3
Fig-4
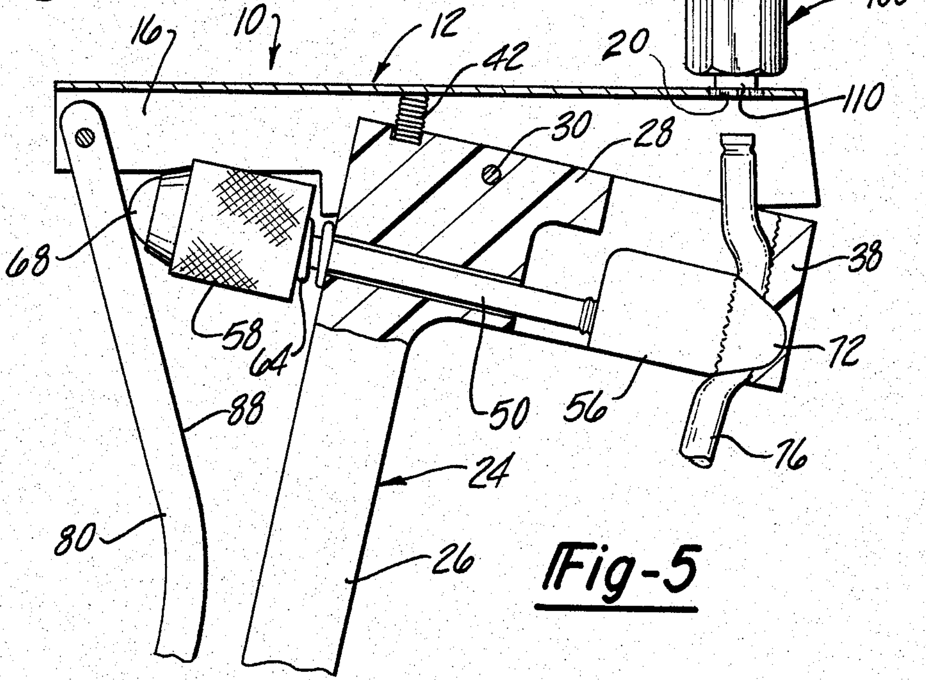
Fig-5

Fig-6
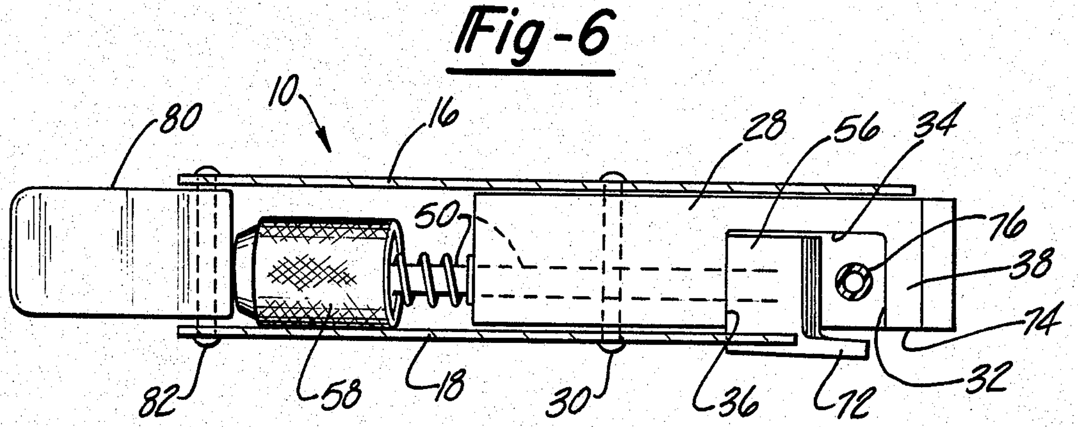
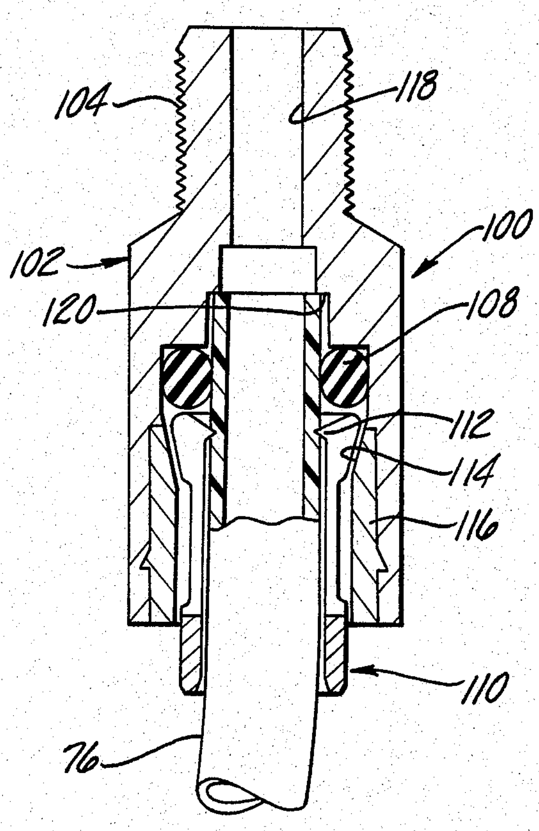
Fig-7

TUBING DISCONNECT TOOL

The present invention relates generally to the field of specialty hand tools, and more particularly to an improved hand tool especially designed for disconnecting tubing from associated coupling hardware.

In the field of fluid coupling fittings used in pneumatic and hydraulic circuits and systems for machine tools and the like, it is now commonplace to employ rapid connect and disconnect fittings designed for use with nylon and other semi-rigid plastic tubings. One well known example of such fittings are the so-called "instant fittings" manufactured and sold by Legris Inc., 244 Paul Road, of Rochester, N.Y. 14624, under the grade designation "LF 3000". Such instant fittings customarily comprise a slotted collet received within a housing and having a tapered shoulder cooperative with a locking slope of the housing such that one end of a semi-rigid plastic tubing is readily insertable through the collet and an associated sealing O-ring. When the tubing is pulled in a withdrawal direction, or when the system is pressurized, the tubing draws the collet along the locking slope, causing a gripping ridge of the collet to grasp the tube tighter, securing it firmly in the fitting.

To disengage the tubing from the instant fitting, it hitherto has been customary to push the protruding end of the collet inwardly into the fitting to disengage the plastic tubing from the locking slope or jaws of the slotted collet. The recommended procedure has been to do this with a screw driver. However, this disconnect procedure can be difficult and time-consuming and potentially injurious to the serviceman or system assembler. The procedure is also clumsy and the screw driver can injure the tubing during the disconnect procedure.

Accordingly, it is an object of the present invention to provide a specially designed hand tool adapted to obviate the aforementioned tubing disconnect procedure and problems, and which enables one-handed disconnecting of tubing from instant fittings in a rapid, reliable, economical and safe manner.

Other objects as well as features and advantages of the present invention will become apparent from the following detailed description taken in connection with the appended drawings wherein:

FIG. 3 is a view similar to that of FIG. 2 but with the tool operated through a first stage of motion wherein the tubing is securely gripped;

FIG. 4 is a fragmentary view, similar to FIG. 3 but illustrating only a portion thereof, showing the operation of the tool at the beginning of a second stage of motion of the tool.

FIG. 5 is a view similar to that of FIGS. 2 and 3, but illustrating the operation of the tool at the completion of the second stage of tool motion, during which the fitting collet has been depressed upwardly and the tubing withdrawn downwardly to disconnect the same from the fitting;

FIG. 6 is a horizontal sectional view taken on line 5—5 of FIG. 2; and

FIG. 7 is an enlarged vertical center section through the instant fitting of FIG. 1 and associated tubing connected therein.

Figure 1:
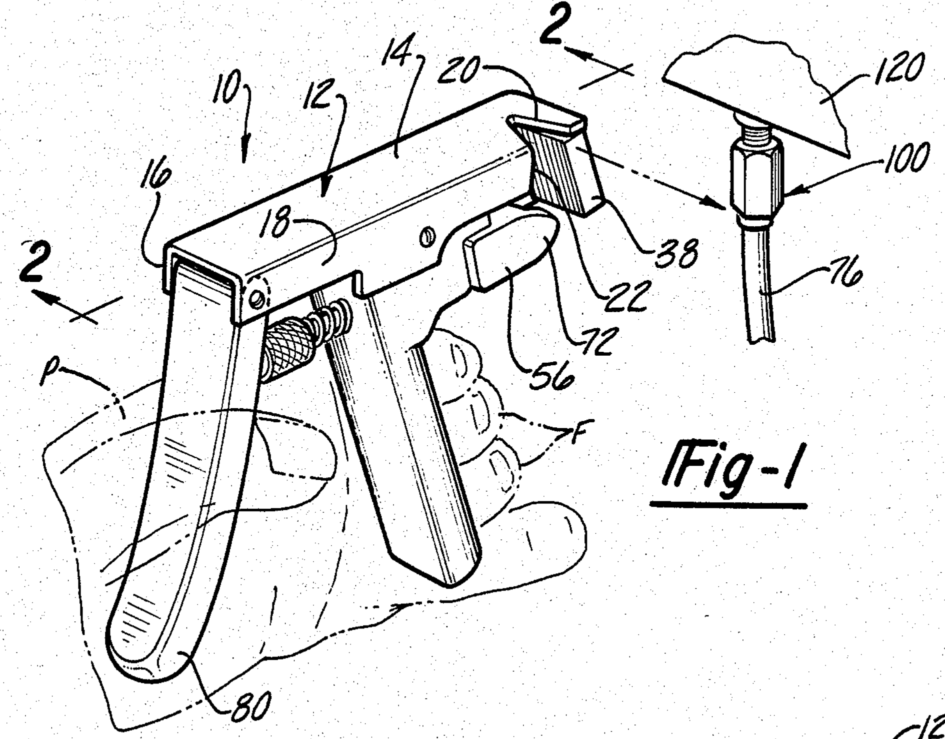
FIG. 1 is a perspective view of one exemplary but preferred embodiment of a tubing disconnect tool provided in accordance with the present invention, with an operator's left hand shown in phantom gripping the tool, and with the tool being brought into proximity to a typical instant fitting having tubing connected thereto.

Referring in more detail to the accompanying drawings:

The embodiment of the tubing disconnect tool 10, shown in FIGS. 1 through 5, preferably comprises a channel-shaped metal main frame member 12 with a flat top wall 14 and dependent side walls 16 and 18. Top wall 14 has a V-shaped notch 20 near its forward end with the notch opening at the right-hand side of the tool as viewed in FIG. 1. Side wall 18 has its forward edge 22 aligned with the rearward edge of notch 20.

Tool 10 further includes an inverted L-shaped bell crank 24 having a handle 26 and a forwardly protruding arm 28 and which is pivotally mounted in frame 12 by a pivot pin 30 extending through and secured to the side walls 16 and 18 of frame 12. The right hand side (as viewed in FIG. 1) of arm 28 has a three-sided rectangular notch formed therein as defined by a front wall 32, a side wall 34 and rear wall 36. Arm 28 thus has a cantilevered end flange 38, the upper surface 40 of which is adapted to abut the undersurface of the forward end of frame wall 14 to thereby define the upper end limit of pivotal travel of bell crank 24 relative to frame 12, as shown in FIG. 2. Bell crank 24 is yieldably biased to this position by a compression coil spring 42 seated at its lower end in a pocket 44 provided in the upper surface 40 of arm 28 between pivot pin 30 and the rearward end of the arm. The upper end of spring 42 freely abuts the undersurface of frame wall 14.

Bell crank 24 carries a tube-gripping plunger subassembly comprising a rod 50 slidably received in a through-bore 52 in arm 28 and which has threads 54 at its forward end threadably receiving a squeeze block 56 thereon. The rearward end of rod 50 has a knurled brass knob 58 with a blind bore 60 in which the rearward end of rod 50 is inserted with a press fit. Bore 60 opens into a counter-bore 62 in which one end of a coil compression spring 64 is seated, spring 64 encircling rod 50 and abutting at its other end against the rear face 66 of arm 28. Knob 58 has a hemispherical pocket 66 formed in its rearward end in which a steel bearing ball 68 is rotatably seated, with a conical keeper portion 70 peened radially inwardly to capture ball 68 in knob 58. As best seen in FIGS. 5 and 6, squeeze block 56 has a forwardly protruding flange or ear 72 extending parallel to the axis of rod 50 adjacent and outwardly of the right hand side surface 74 of arm 28 (as viewed in FIG. 1). In the fully retracted position of the squeeze block 56 (FIGS. 1, 2, 3 and 6), the tip of ear 72 is spaced rearwardly of notch wall 32 a predetermined distance to provide an access gap for receiving the tubing 76 sideways into the arm notch.

Tool 10 further comprises a cam lever 80 pivotally mounted at its upper end to the rearward end of frame 12 by a pivot pin 82 extending between and secured to frame walls 16 and 18. Lever 80 extends downwardly from frame 12 to a bend 84 and terminates at a free end 86 approximately equi-distant from frame 12 with respect to the lower end of handle 26. The forward face 88 of the upper portion of lever 80 is adapted to rest against and abut bearing ball 68 for rotational movement of ball 68 therealong through the range of relative motion shown in FIGS. 2 through 5.

FIG. 7 illustrates, by way of example, one commercial form of the aforementioned Legris Model LF 3000 instant fitting 100 with which the tubing disconnect tool 10 of the present invention is particularly adapted for cooperation therewith. Fitting 100 comprises a brass body 102 having a threaded nipple 104 at its upper end and hexagonal flats 106 (FIG. 3) for wrench rotation of the fitting. Fitting 100 contains a sealing O-ring 108 and a slotted collet 110 with a gripping ridge 112. Collet 110 can move axially of fitting 100 between O-ring 108 and a locking slope 114 of an insert collar 116. One end of the semi-rigid plastic tubing 76 is insertable into fitting 100 to make a sealed connection with the fitting bore 118 by inserting the tube end upwardly into collet 110 and slidably past the gripping ridge 112 and through O-ring 108 until the end of the tube abuts an interior shoulder 120 of the fitting. Collet 110 flexes radially outwardly to allow gripping ridge 112 to expand during such tubing insertion. When tubing 76 is pulled downwardly (as viewed in FIG. 7), or the system is pressurized to provide fluid pressure in bore 118 and tubing 76, the downward force in the tubing draws the collet 110 downwardly such that its upper tapered end slidably engages the locking slope 114, thereby causing the gripping ridge 112 to grasp the tubing 76 tighter and securing it firmly in the fitting.

As indicated previously, hitherto in order to disconnect tubing 76 from fitting 100, the procedure recommended was to grip tubing 76 with one hand and, by means of a screw driver grasped in the other hand, to push the slotted collet 110 upwardly to disconnect it from the locking slope 114, thereby allowing the tubing 76 to be drawn downwardly past the gripping ridge 112 and out of the fitting 100.

Figure 2:
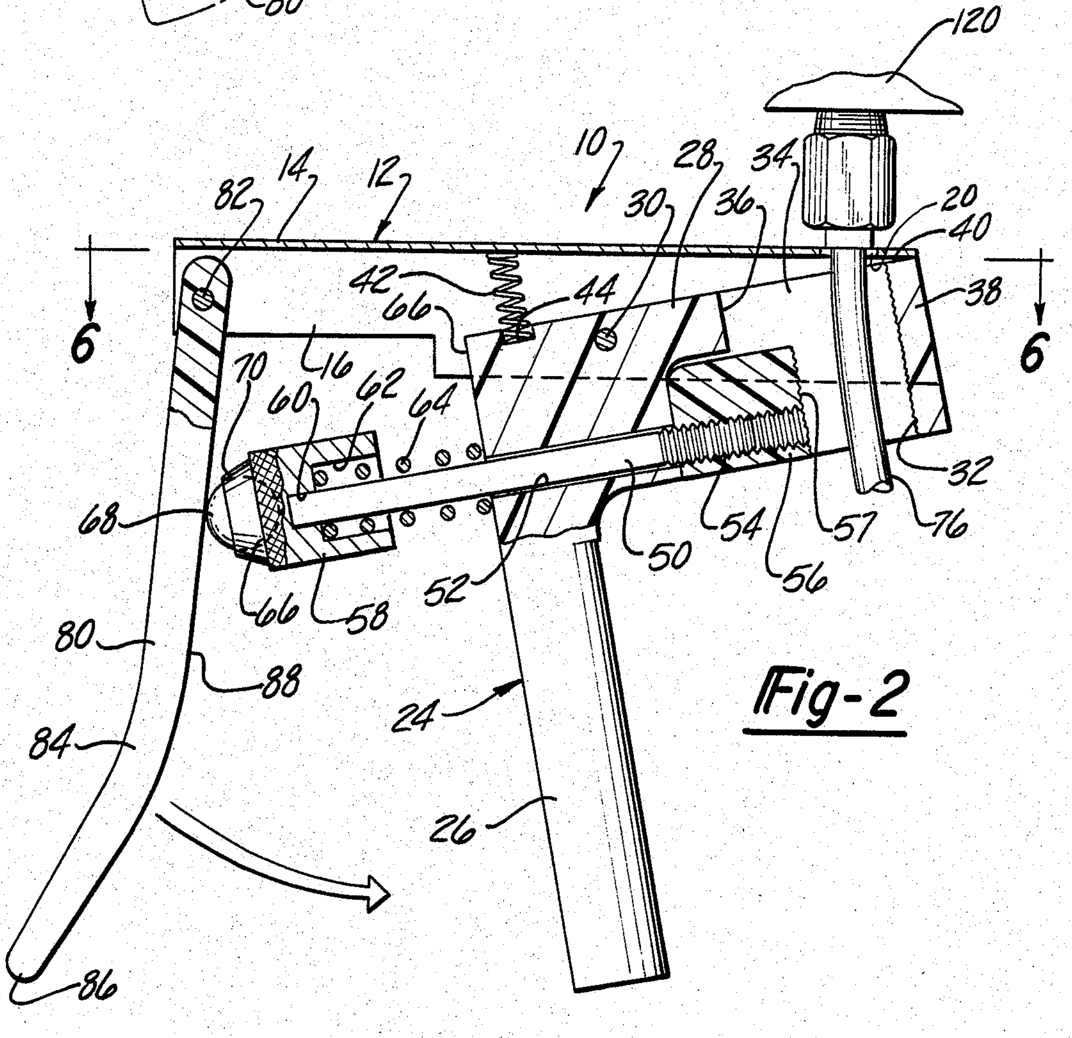
FIG. 2 is a vertical side elevational view of the tubing disconnect tool of FIG. 1, with portions shown in vertical center section, and with the tool positioned relative to the fitting and tubing to initiate disconnect operation of the tool.

In accordance with the present invention, tool 10 now enables much more rapid and one-handed disconnection of tubing 76 from fitting 100, by operation of tool 10 in the following manner:

Referring to FIG. 1, fitting 100 with tubing 106 is connected thereto shown mounted to a fluid manifold 120. Tool 10 is gripped by the operator in one hand, a left hand being illustrated in phantom in FIG. 1 with the fingers F around handle 26 and the thumb T and hand palm P straddling lever 80. As so gripped, and with handle 26 and lever 80 biased apart by springs 42 and 64 to their respective fully separated positions illustrated in FIGS. 1 and 2, tool 10 is juxtaposed to tubing 76 and fitting 100 by moving the tool laterally against tubing 76 to slip the tubing through the clearance between ear 72 and flange 38. Tool 10 is held with wall 14 spaced slightly below fitting 100, until the tubing OD is fully engaged in the V-notch 20 as far as possible. Tool 10 is then raised to abut the upper surface of wall 14 against the undersurface of the protruding end of collet 110, as shown in FIG. 2. Then, the operator squeezes lever 84 to pivot it clockwise from its position as shown in FIG. 2 to that of FIG. 3, thereby forcing, via ball 68, bushing 58 and rod 50, the squeeze block 56 forwardly into engagement with the portion of tubing 76 entrapped between the forward face 57 of block 56 and the juxtaposed surface 32 of flange 38. Preferably, these surfaces are formed with serrations extending transverse to the axis of tubing 76 (parallel to the axis of pin 30) to enhance this gripping action. During this first stage of motion of tool 10, ball 68 remains essentially at the same point of contact with surface 88 of lever 80.

Continued squeezing of lever 80 toward handle 26 produces a second stage of motion of tool 10. At the on-set of this second stage, the axis of rod 50 is generally perpendicular to surface 88 and spring 64 is essentially fully compressed. The biasing force exerted by spring 42 is such as to insure this sequence. As lever 80 is pivoted past the FIG. 3 position toward the FIG. 4 position thereof, the angle of incidence of the axis of rod 50 to surface 88 moves from perpendicular to an acute included angle, thereby producing, with a large and increasing mechanical advantage, a lever cam action which imparts clockwise (as viewed in FIGS. 2-5) pivoting forces on bell crank 24 and thus a downward pulling force on tubing 76, simultaneously with an upward pushing force exerted by wall 14 on collet 110. This simulates the aforementioned prior two-handed disconnect technique (i.e., one hand gripping tubing 76 and the other forcing the end of the screw driver upwardly against collet 110), but in a much more reliable, uniform and non-injurious manner, causing collet 100 to move upwardly within fitting 100 to release the tubing from the collet.

At the completion of this second stage of motion, illustrated in FIG. 5, bell crank 24 has been pivoted clockwise until bushing 58 abuts the frame side wall 18 and/or lever 80 abuts handle 26, thereby drawing tubing 76 clear of collet 110. Then squeeze pressure is released from handle 26 and lever 80, allowing springs 42 and 64 to pivot bell crank 24 and lever 80 back to their original positions as shown in FIG. 2, and simultaneously retracting squeeze block 56 to thereby release the disconnected tubing 76 from the tool. Of course, as soon as tubing 76 has been withdrawn by tool 10 from collet 110, tool 10 may be withdrawn sidewardly and/or downwardly away from engagement with fitting 100.

It is to be understood that spring 42 is an optional but preferred element of the combination since this spring insures that plunger rod 50 is fully advanced into tube gripping position prior to pivoting of bell crank 24 away from its initial position of FIG. 2 wherein flange 38 abuts frame wall 14. Hence, tubing sizes ranging in diameter from $\frac{3}{8}''$ down to $\frac{1}{8}''$ will all be firmly gripped prior to the tube stripping or disconnect pull-out motion so that full tube stripping travel will be imparted by tool 10 throughout a range of tubing sizes.

It will also be noted that the ear 72 on squeeze block 56 provides a movable gate which entraps tubing 76 within the notch of arm 28 as block 56 is being advanced into engagement with the tubing, thereby capturing the tubing and preventing the same from slipping sideways out of the grip cavity. Due to the threaded mounting of block 56 on rod 50, the overall effective length of tube-gripping sub-assembly may be readily adjusted to accommodate different diametrical sizes of tubing. This is accomplished by merely rotating the knurled bushing 58 with the operator's fingers to thread block 56 back and forth on rod 50, block 56 being held against rotation by the notch sidewall 34 of arm 28. In one successful working embodiment of tool 10 of the invention, lever 80, bell crank 24 and block 56 have been made out of rigid nylon material molded and/or machined to final configuration to provide a strong and wear-resistant mechanism.

From the foregoing description and appended drawings (which are essentially to scale and may be used as working drawings), it will now be apparent that the tubing disconnect tool of the present invention greatly facilitates the tubing disconnect procedure over that hitherto employed and provides a strong, simple, economical hand tool enabling one-handed disconnect of tubing from instant fittings and the like in a rapid, safe and non-injurious manner.

While the particular hand tool herein shown and described in detail is fully capable of obtaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure. Moreover, various words of orientation, such as "top", "bottom", "forward", "rearward", "upwardly" and "downwardly", etc., are used merely as words of description and not by way of limitation with reference to the exemplary orientation of tool 10 as illustrated in the appended drawings.

I claim:

1. A hand tool for disconnecting a tubular member from associated connector fitting by imparting relative separation forces on said tubing and fitting in a direction generally axially of the tubing, comprising a frame member having means adapted to engage the fitting to exert a separating force thereon, a bell crank pivotally connected to said frame member and having means movably mounted thereon and operable for engaging and releasing said tubing in the vicinity of said fitting, and a lever pivotally connected to said frame and movable relative to said bell crank for sequentially imparting tube gripping engagement of the tubing by said bell crank and pivoting motion to said bell crank to thereby draw the tubing away from the fitting and to thus disconnect the tubing from the fitting, said tube gripping means comprising a plunger sub-assembly slidably mounted in said bell crank and having a squeeze block mounted on one end thereof and movable relative to a juxtaposed tube-engaging portion of said bell crank, said plunger sub-assembly also having a follower means mounted thereon remote from said squeeze block and operably abuttingly engageable with said lever such that movement of said lever relative to said bell crank through a first stage of motion abuttingly pushes said follower means to thereby advance said sqeeze block into engagement with the tubing and squeezes the tubing between the squeeze block and said juxtaposed tubing engaging means of said bell crank and imparts in a sequential second stage of motion via a camming lever action the pivotal tube stripping motion to said bell crank.

2. A tool at set forth in claim 1 wherein said bell crank comprises a generally L-shaped member having an arm pivotally mounted to said frame member and a notch therein providing a tubing-receiving cavity in which said squeeze block travels and further having an end flange defining said tubing engaging means of said bell crank, said bell crank also comprising a handle portion extending away from said frame member in a direction generally perpendicular to squeeze block travel, said plunger sub-assembly further comprising a rod extending through and slidable within a through-bore in said bell crank and protruding at its opposite ends therefrom, one end of said rod threadably receiving said squeeze block thereon, said follower means comprising cam abutment means secured to the opposite end of said rod for abutting and camming prying engagement with said lever, said sub-assembly further including spring means biasing said plunger assembly toward the retracted position of said squeeze block and forcing said lever and bell crank to an initial fully separated position and said arm flange of said bell crank into angulated abutment with said frame member.

3. A tool as set forth in claim 2 wherein said spring means comprises a coil compression spring encircling said rod and disposed between said bell crank and said bushing.

4. A tool as set forth in claim 3 wherein said spring means further comprises a second coil compression spring disposed between said bell crank and said frame member and yieldably biasing said bell crank towards the aforesaid initial position abutting said frame member.

5. A tool as set forth in claim 4 wherein said frame member comprises a rigid channel-shaped part having a top wall and a pair of side walls dependent therefrom, the arm of said bell crank being partially received between said side walls and pivotally connected thereto by a pivot pin secured to said side walls and extending through said arm.

6. A tool as set forth in claim 2 wherein said squeeze block has a keeper ear protruding therefrom and adapted to open and close the open side of said arm notch as said squeeze block is respectively moved toward retracted position and toward tube squeezing position.

7. A tool as set forth in claim 2 wherein said lever and bell crank are oriented relative to one another and to said frame member in the initial abutted position of said arm flange and frame member such that said bell crank handle and lever are spaced apart for gripping of the handle with the fingers of one hand and gripping of the lever with the thumb and palm of the same hand, said cam abutment means including a bearing ball rotatably carried therein, said lever having a camming surface abutted by said bearing ball, said plunger axis intersecting the lever camming surface at an obtuse angle included between the remote free ends of the lever and handle, said rod axis being generally normal to the lever camming surface at the completion of the first stage of motion with said squeeze block extended into gripping engagement with the tubing and the tubing squeezed against said arm flange in response to pivoting motion of said lever towards said bell crank by hand squeeze pressure, the orientation of said frame, bell crank and lever being such that further squeezing of said lever toward said bell crank handle cams said bearing ball of said follower means further along the camming surface of said lever to impart pivotal motion to said bell crank relative to said frame member by a camming prying action of increasing mechanical advantage as the included angle between the lever and handle changes from said normal incidence to an acute included angle.

8. A tool as set forth in claim 2 wherein said frame member has a notch therein open at one side to receive the tubing laterally bodily into said frame member and subjacent notch cavity of said bell crank arm with the margin of said notch being engageable with said fitting to exert the aforesaid separation force thereon.

9. A tool as set forth in claim 2 wherein said squeeze block is threadably received on said rod and restrained against rotation relative to said bell crank arm by a non-rotational surface engagement with said arm whereby the effective length of said plunger sub-assembly may be varied by rotating said rod relative to said squeeze block to thread said squeeze block back and forth along said rod.

* * * * *